United States Patent [19]
Miller et al.

[11] Patent Number: 5,339,851
[45] Date of Patent: Aug. 23, 1994

[54] ASSEMBLY FOR ATTACHING A REMOVABLE TENT TO A MOTOR VEHICLE

[76] Inventors: Mark W. Miller, 32961 Pinnacle Dr., Trabuco Canyon, Calif. 92679; Sean A. Cheatham, 11851 Mac St., Garden Grove, Calif. 92641

[21] Appl. No.: 998,799

[22] Filed: Dec. 30, 1992

[51] Int. Cl.⁵ .............................................. E04H 15/06
[52] U.S. Cl. ........................................ 135/88; 296/105; 135/104
[58] Field of Search .................. 135/88, 96, 102, 104; 296/43, 156, 159, 160, 163, 164, 167, 105

[56] References Cited
U.S. PATENT DOCUMENTS

| | | |
|---|---|---|
| 3,466,082 | 9/1969 | Branch . |
| 4,263,925 | 4/1981 | Arganbright . |
| 4,652,040 | 3/1987 | Mahan . |
| 4,657,299 | 4/1987 | Mahan . |
| 4,766,918 | 8/1988 | Odekirk ............................ 135/96 X |
| 4,938,523 | 7/1990 | Camp . |

*Primary Examiner*—Carl D. Friedman
*Assistant Examiner*—Lan C. Mai
*Attorney, Agent, or Firm*—Hawes & Fischer

[57] ABSTRACT

A tent to be quickly and easily attached to or removed from the rear of a motor vehicle (e.g. a pick-up truck) having a substantially flat and open bed. The tent includes a frame comprising a pair of pole assemblies that extend diagonally and cross one another above the bed of the truck. The tent also includes front, back and side panels and belts which extend laterally through channels in the front and back panels and down the sides of the truck to be removably connected to the undercarriage thereof. A pair of cup-like receptacles are slidably attached to each of the belts. The cups are adjustably positioned along the belts to receive respective ends of the pole assemblies which form the tent frame. Accordingly, the weight of the frame and the tent carried thereon is supported by the cups and the belts retained by the front and back tent panels so that the tent may be suspended above the bed without requiring any permanent connections to or modifications of the truck.

20 Claims, 5 Drawing Sheets

ASSEMBLY FOR ATTACHING A REMOVABLE TENT TO A MOTOR VEHICLE

BACKGROUND OF THE INVENTION

1. Field of the Invention

This invention relates to a tent that may be quickly and easily attached to or removed from the rear of a motor vehicle (e.g. a pick-up truck) having a substantially flat and open bed without requiring any permanent connections to or modifications of the vehicle.

2. Background Art

Those visiting parks, mountain, desert and other out-of-door locations frequently wish to camp overnight. In many instances, there is no shelter readily available to protect the camper from rain, snow, wind, heat and other weather conditions. One common solution to the foregoing is for the camper to erect a portable shelter such as a tent to provide protection against the elements. Traditionally, tents have been erected above ground. Suitable staking means are typically employed to secure the tent to the ground so as to withstand the effects of strong winds, and the like.

It has also been known to secure a tent to the rear of a motor vehicle having a flat bed. In these cases, the tent is affixed directly to the body of the vehicle. Consequently, the vehicle has had to be structurally altered to accommodate and retain the tent. The foregoing has necessitated special tools and/or skill before the tent could be installed or removed from the vehicle. Moreover, the cost and inconvenience associated with erecting a tent of this nature on the vehicle is correspondingly increased. What is more, the alterations to the vehicle remain even after the tent is removed.

It would therefore be desirable to have a portable tent that may be quickly and easily attached to and removed from the rear of a motor vehicle without requiring special tools and/or skill and without necessitating that any permanent connections or modifications be made to the vehicle.

Examples of tents which are affixed to the rear of a motor vehicle are available by referring to one or more of the following U.S. patents:

U.S. Pat. No. 3,466,082, Sep. 9, 1969
U.S. Pat. No. 4,263,925, Apr. 28, 19
U.S. Pat. No. 4,652,040, Mar. 24, 1987
U.S. Pat. No. 4,657,299, Apr. 14, 1987
U.S. Pat. No. 4,938,523, Jul. 3, 1990

SUMMARY OF THE INVENTION

In general terms, a tent is disclosed that may be quickly and easily attached to and removed from the rear of a motor vehicle (e.g. a pick-up truck) having a substantially flat and open bed. The tent includes a conventional tent frame comprising a pair of elongated, diagonally extending pole assemblies attached to the tent through elongated sleeves. The tent also includes the usual front and back panels and opposing side panels that are sewn together to form the tent enclosure that is suspended above the bed of the truck by means of the frame. The front panel is provided with a closure by which to permit entry into and exit from the tent.

In accordance with the present invention, the tent is detachably connected to a truck without requiring any modifications thereto. More particularly, a pair of belts extend laterally through respective channels $formed in each of the front and back panels. The opposite ends of the belts are connected to generally L-shaped clasps by way of hold-down straps. The hold-down straps are pulled downwardly along the sides of the truck, and the clasps are releasably attached to the undercarriage of the truck. Accordingly, the tent will remain reliably connected to the truck when exposed to high wind conditions, and the like. In addition, the front and back panels of the tent have a cross strip affixed to each side thereof. The cross strips are provided with areas of hook and look fastener material that are adapted to be mated to complementary areas of hook and loop fastener material located at adjacent side panels of the tent. By mating the areas of fastener material together, the cross strips affixed to the front and back panels of the tent can be attached to the side flaps in order to hold the front and back panels against the truck.

Each of the belts which extends laterally along the front and back panels of the tent is provided with a pair of receptacles or cups. The cups are slidably attached to the belts so that the position of the cups along the belts can be adjusted to correspond to the size of the tent frame. In the assembled configuration, each cup is adapted to receive one end of a pole assembly which forms the tent frame. In this manner, the weight of the tent frame and the tent carried thereon is supported by the cup receptacles and the belts of the front and back panels so that the tent can be suspended above the bed of the truck without making any permanent connections to the truck.

DETAILED DESCRIPTION

Figure 1:
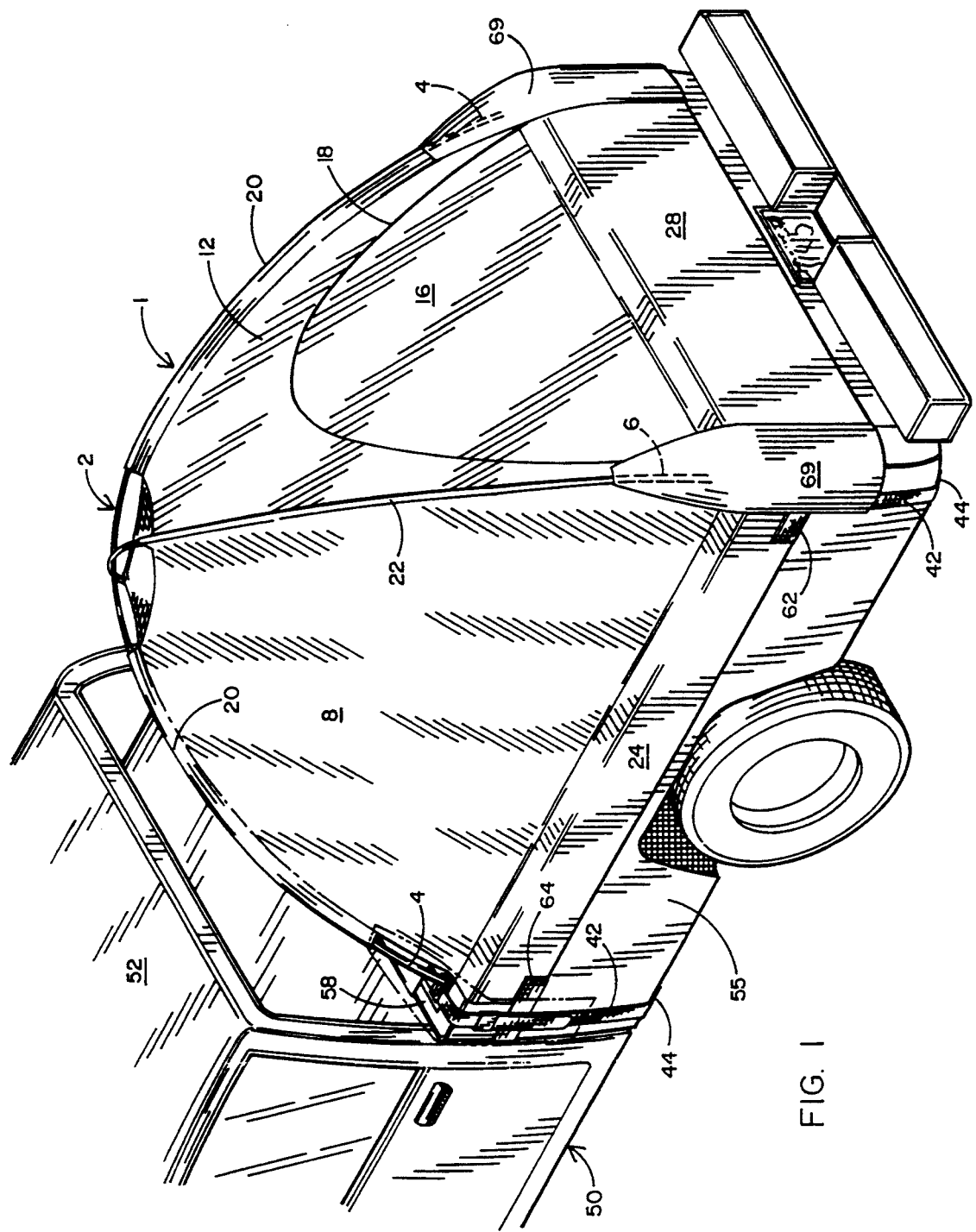
FIGS. 1 and 2 show a pick-up truck having a tent removably secured above a flat bed thereof according to the present invention.
Figure 2:
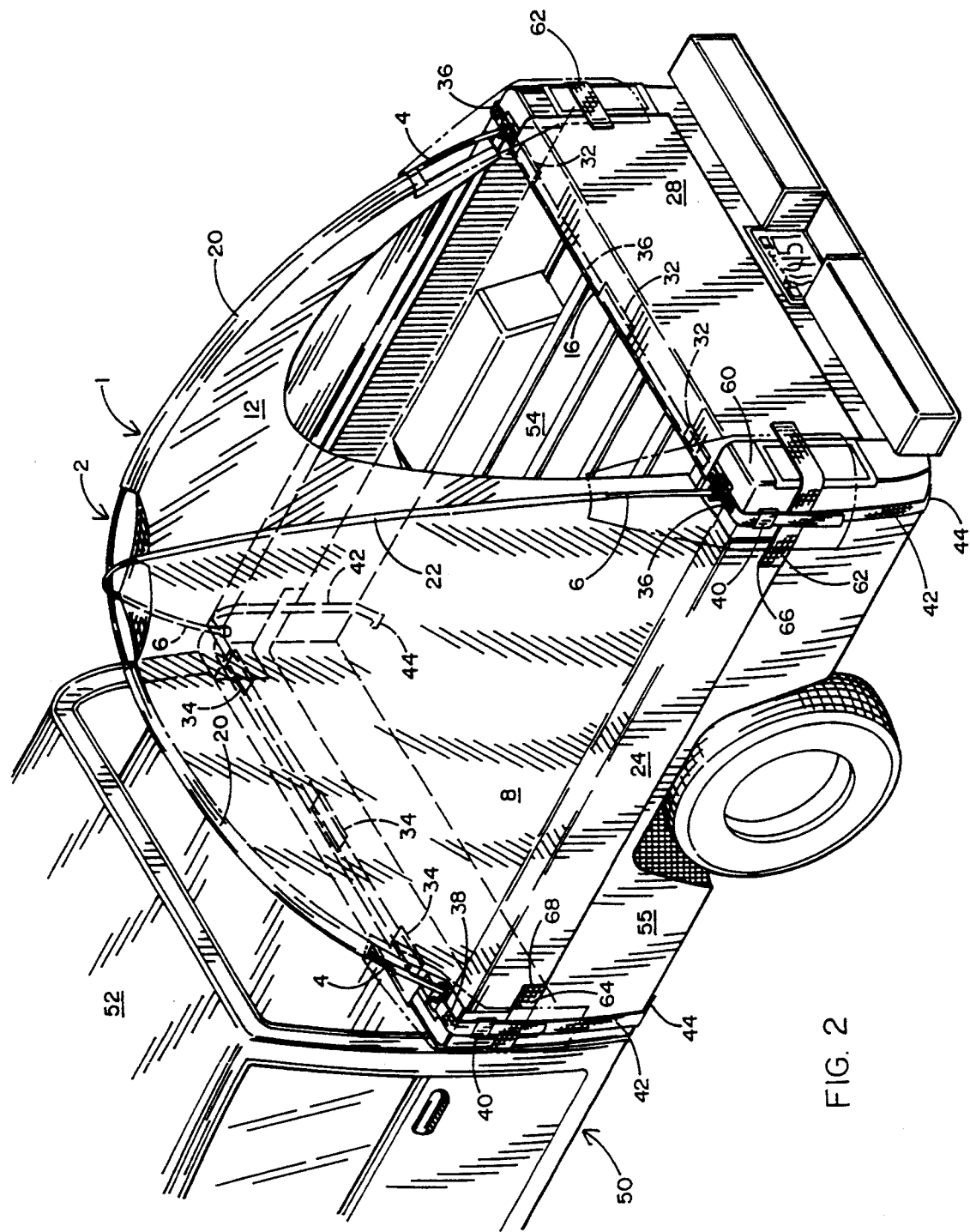
Figure 3:
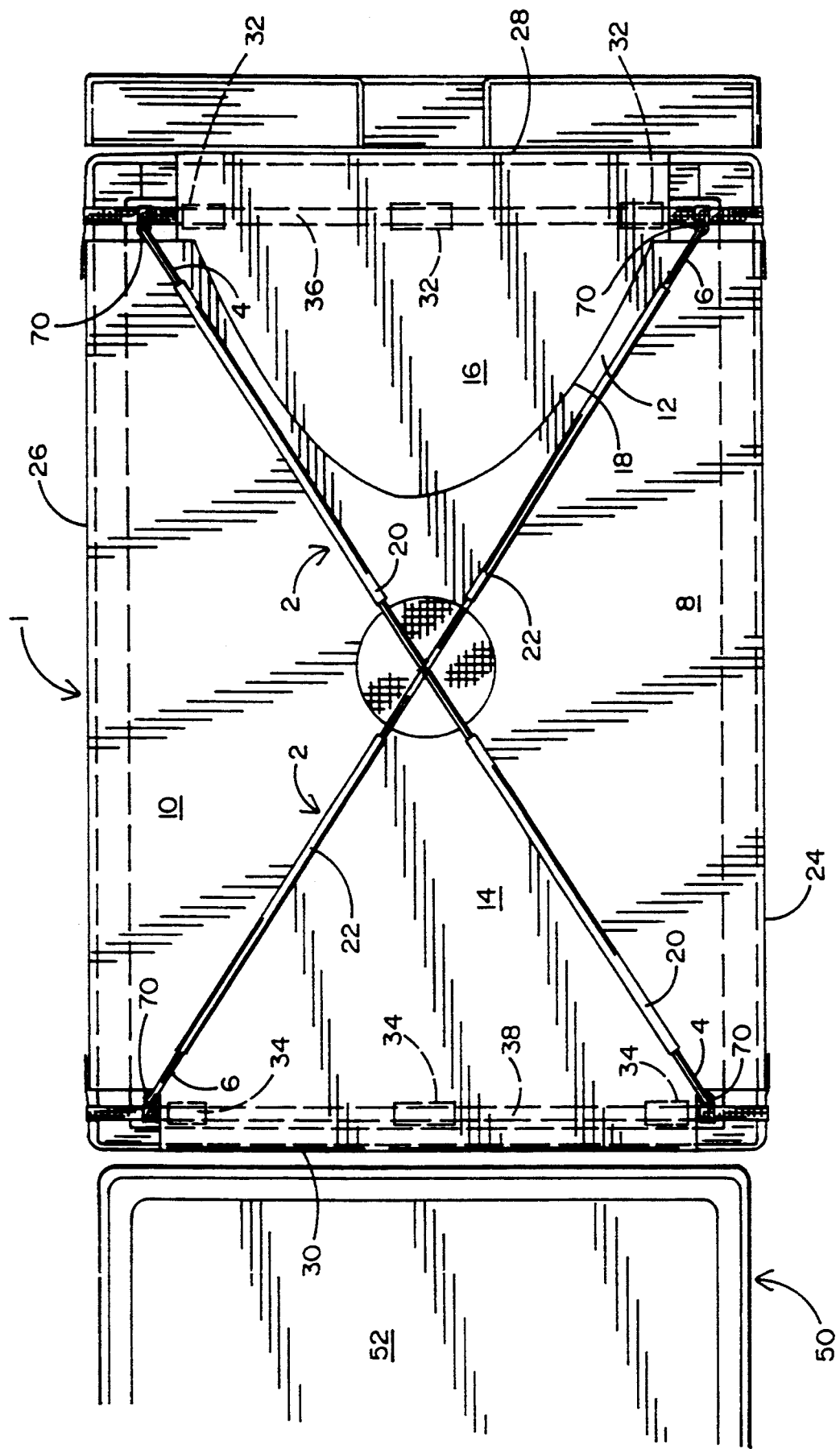
FIG. 3 is a top view of FIG. 1.

The tent 1 which forms the present invention is now described while referring initially to FIGS. 1-3 of the drawings. The tent 1 may be quickly and easily attached to the rear of a motor vehicle having a substantially flat and open bed, such as, for example, the pick-up truck 50 illustrated herein. The front of the pick-up truck 50 has the usual cab 52 in which passengers are transported, while the rear has a flat bed 54 (best shown in FIG. 2) surrounded by opposite side walls 55 and 56, a head liner 58 and a tailgate 60 that is pivotally moved between upright and horizontal positions.

The tent 1 is constructed of any suitable tear-resistent tent material, such as plastic, cloth, or the like. It is desirable that the material for manufacturing tent 1 be both waterproof and opaque to sunlight. The tent 1 is supported above the bed 54 of truck 50 by means of a frame 2. The frame 2 is formed by a pair of pole assemblies 4 and 6 which are preferably manufactured from a flexible, non-corrosive material such as fiberglass. Each of the pole assemblies 4 and 6 of frame 2 may be a single, elongated tube or, as shown herein, several tubular members that are serially connected (e.g. by means of a well known shock cord) end-to-end one another. In the assembled relationship, the pole assemblies 4 and 6 are bent so as to arc diagonally across the bed 54 of truck 50 and cross one another at the highest point of frame 2. As will soon be disclosed, and as an important advantage of the present invention, the frame 2 for supporting tent 1 above the bed 54 may be both reliably interfaced with and easily removed from the truck 50 without having to make any permanent connections or alterations to the truck.

The tent 1 is of conventional shape, having a pair of side panels 8 and 10, a front panel 12 and a back panel 14, all of which being sewn together to create an enclosure above the bed 54 of truck 50. A closure 16 is located within the front panel 12 to permit exit from or entry into the tent 1. The closure 16 may be closed (in FIG. 1) or opened (in FIG. 2), as desired, by means of a zipper 18 that extends around the interface of the closure 16 with the front panel 12. The peak of tent 1 may be opened to the atmosphere (as shown) or closed by means of a removable top.

A plurality of elongated sleeves 20 and 22 are formed at the exterior of tent 1, preferably along the seams between the back panel 14 and side panels 8 and 10 and the front panel 12 and side panels 8 and 10. The sleeves 20 and 22 are of suitable dimension to receive respective pole assemblies 4 and 6 therethrough. That is, with the diagonally extending pole assemblies 4 and 6 running through sleeves 20 and 22, the tent 1 will be connected to the frame 2 so that the tent enclosure can be maintained above the bed 54 of truck 50.

The lower-most end of each side panel 8 and 10 of tent 1 terminates at a respective side flap 24 and 26. The lower-most end of the front panel 12 of tent 1 terminates at a front flap 28 that covers the tailgate 60 of truck 1, and the lower-most end of the back panel 14 terminates in a back flap 30 (best shown in FIG. 3). The bottom of closure 16 and front flap 28 of the front panel 12 of tent 1 are coextensive with one another, such that with the zipper 18 in the open condition (of FIG. 2) the closure 16 can be folded inwardly relative to front flap 28 for receipt along the truck bed 54.

Figure 4:
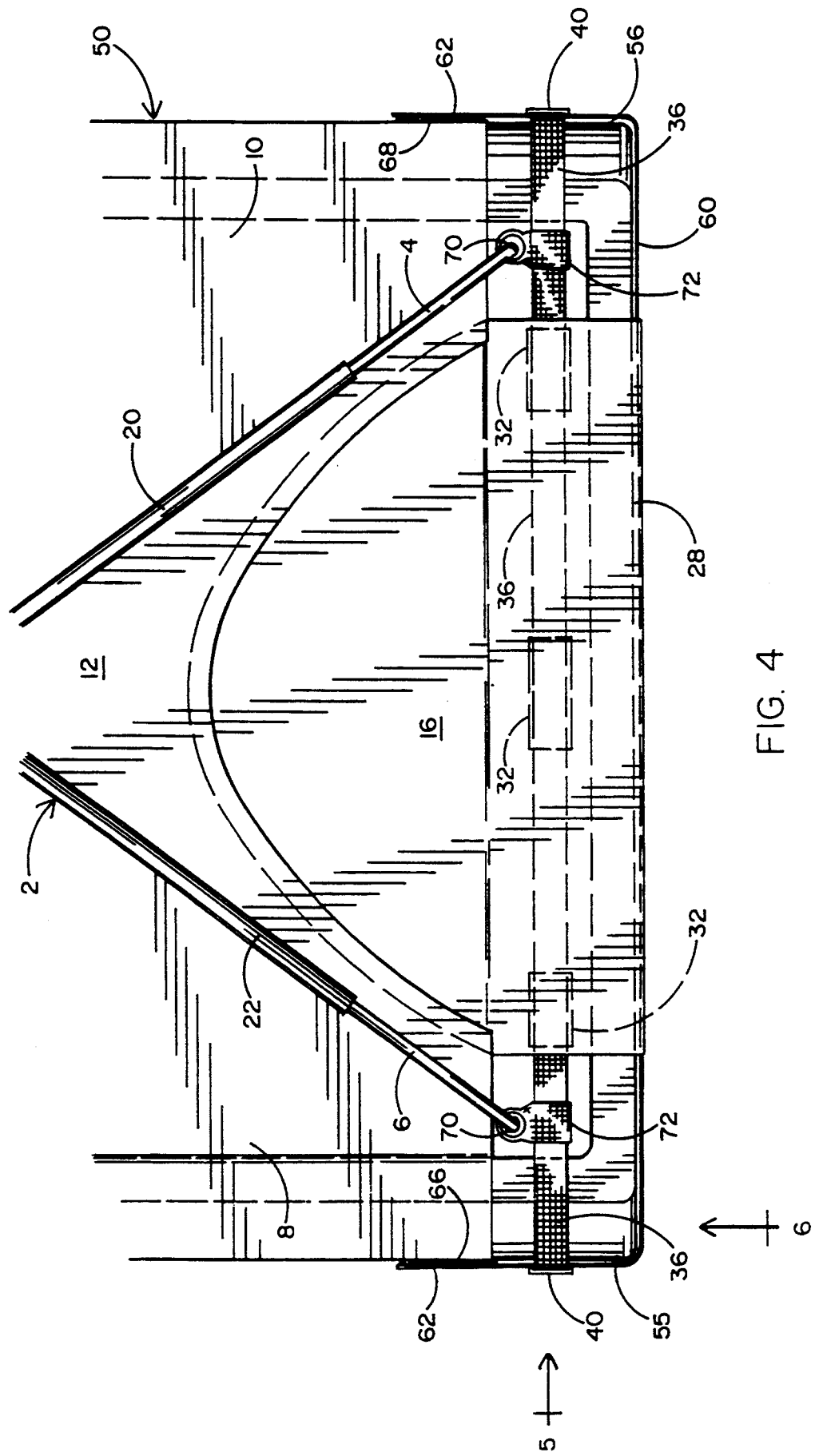
FIG. 4 is an enlarged area taken from FIG. 3 showing the tent secured to the rear of the truck.
Figure 5:
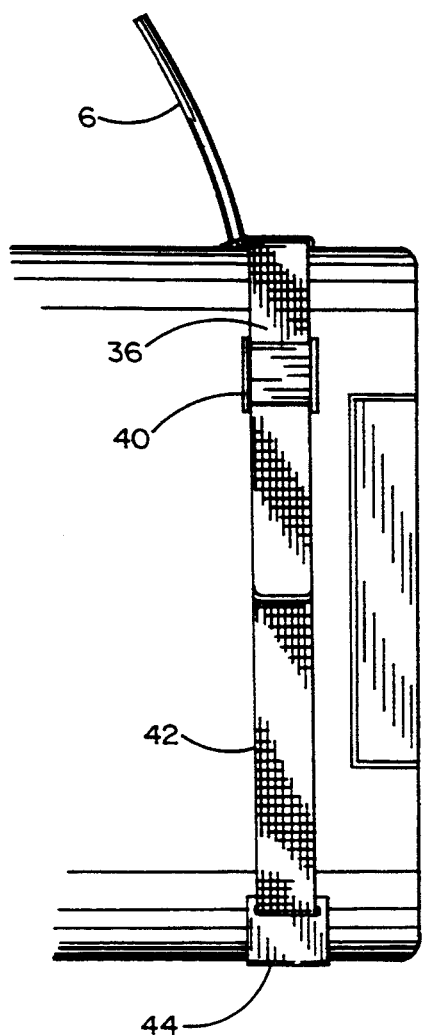
FIG. 5 is a side view taken along lines 5—5 of FIG. 4.
Figure 6:
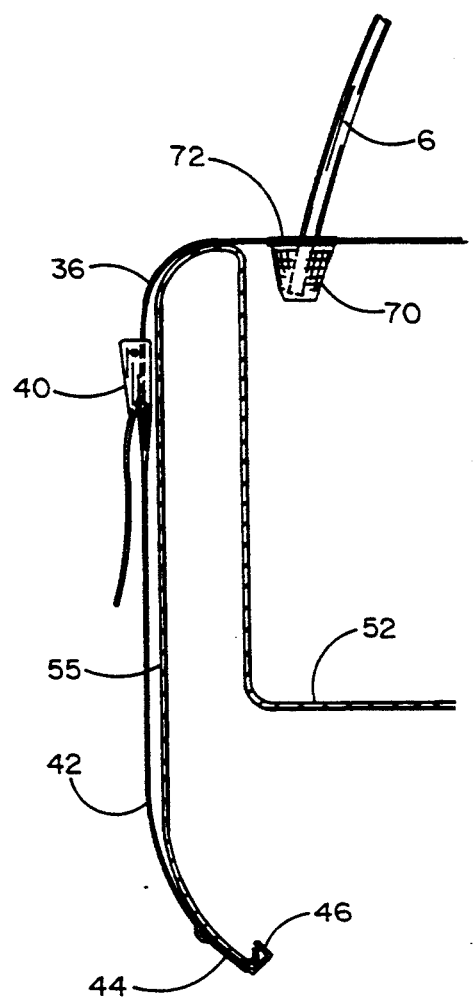
FIG. 6 is an end view taken along lines 6—6 of FIG. 4.
Figure 7:
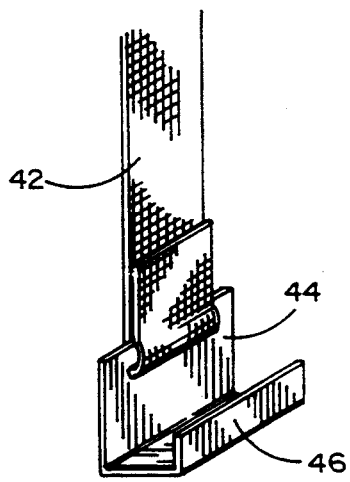
FIGS. 7 and 8 show details of the present invention for removably securing the tent to the truck without making any modifications thereto.

The means for attaching the tent 1 to the truck 50 without requiring permanent connections or alterations to the truck are now described. Running laterally along the front and back panels 12 and 14 of tent 1 between the sides 55 and 56 of truck 50 are hollow channels 32 and 34. Each channel 32 and 34 may consist of a continuously extending passage or, as best shown in FIG. 4, a series of axially aligned channel sections or belt loops. By way of example, the channel 32 (also shown in FIGS. 2 and 3) extends laterally across the front panel 12 of tent 1 at the interface of the closure 16 with the front flap 28 and above the tailgate 60 of truck 50. The hollow channels 32 and 34 of the front and back panels 12 and 14 are sized to receive respective belts 36 and 38 therethrough (also best shown in FIGS. 2-4). Each end of each of the belts 36 and 38 is coupled to a respective buckle 40 (best illustrated in FIGS. 5 and 6). Coupled to each buckle 40 is one end of a respective elastic hold-down strap 42. The opposite end of each hold-down strap 42 is affixed to a respective generally L-shaped clasp 44 (best shown in FIG. 7). The L-shaped clasp 44 includes a turned-up lip 46 which, as will now be explained, is adapted to be removably attached below a side 55 or 56 of the truck 50 to secure the tent 1 to the undercarriage thereof.

More particularly, and as is best shown in FIGS. 4-8 of the drawings, each end of a belt (e.g. 36) which extends through a channel (e.g. 32) along the front and back panels (e.g. 12) of the tent 1 is attached to the undercarriage of the truck 50 by way of a buckle 40, a hold-down strap 42 which runs downwardly along a side (e.g. 55) of the truck, and the lip 46 of a clasp 44. The buckle 40 permits the length of the belt 36 to be adjusted depending upon the distance between the opposing sides 55 and 56 of the truck 50 with which the tent 1 is associated. Moreover, the elastic nature of hold-down strap 42 enables sufficient tension to be applied to the belt 36 to reliably secure the front and back panels 12 and 14 of tent 1 to the head liner 58 and tailgate 60 of truck 50.

As was just described, the hold-down straps 42 extend downwardly from buckles 40 along the sides (e.g. 55) of the truck 50 so as to exert a downward pulling force on the tent 1. As is best shown in FIG. 2, hold-down straps 42 are positioned over top the side flaps (e.g. 24) of the tent 1. In this manner, and by means of the hold-down straps 42, the side flaps 24 and 26 can be secured to and held down against respective sides 55 and 56 of the truck, whereby to avoid the effects of a heavy wind and similar atmospheric conditions which might otherwise blow the side flaps 24 and 26 of tent 1 away from the truck 50.

In order that the front and back flaps 28 and 30 of the tent 1 may be secured to and held down against the respective head liner 58 and tailgate 60 of the truck 50 (also best shown in FIG. 2), each of the front and back flaps 28 and 30 is provided with a pair of thin cross strips 62 and 64 of tent material secured to the respective sides thereof. That is, a first end of each strip 62 and 64 is affixed (e.g. sewn) to the sides of the front and back flaps 28 and 30 of tent 1, while the opposite end of each strip 62 and 64 is provided with a piece of hook and loop fastener material (not shown) at the underside thereof. Complimentary pieces of hook and loop fastener material 66 and 68 are affixed to adjacent sides of the side flaps 24 and 26 of tent 1.

In the assembled tent configuration of FIGS. 1 and 2, the cross strips 62 and 64 are pulled outwardly and laterally away from the front and back flaps 28 and 30 to which they are attached, so that the hook and loop material thereof may be mated to the complimentary hook and loop material 66 and 68 located at the side flaps 24 and 26. If desired, the strips 62 and 64 may be attached to the side flaps 24 and 26 underneath the hold-down straps 42 that run downwardly over top the side flaps. Accordingly, with the cross strips 62 and 64 extending between front and back flaps 28 and 30 and side flaps 24 and 26, the front and back flaps 28 and 30 of tent 1 are also adapted to withstand the effects of a strong wind so as to remain secured against the tailgate 60 and head liner 58, respectively, of the truck 50.

The tent 1 may also be provided with optional corner flaps 69 (best shown in FIG. 1). Each corner flap 69 is positioned to cover the opening formed at the intersection of the front and back flaps 28 and 30 with the side flaps 24 and 26. A relatively narrow upper end of each corner flap 69 is affixed (e.g. sewn) to a respective sleeve 20 or 22, and a relatively wide lower end of each corner flap 69 hangs loosely over a normally open corner of the tent 1. The optional corner flaps 69 advantageously block the wind, rain and similar weather conditions from reaching the interior of the tent 1 through the corner openings that are usually created between the front and back flaps 28 and 30 and their adjacent side flaps 24 and 26.

Figure 8:
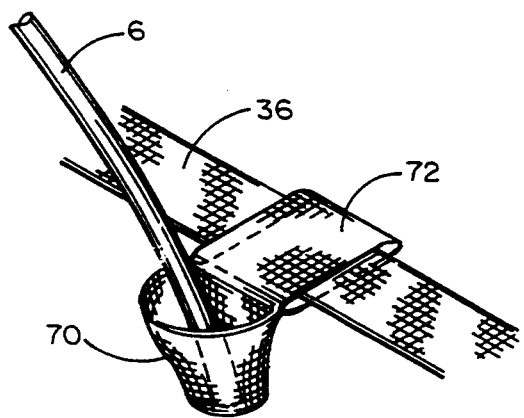

The means are now disclosed for positioning the diagonally extending pole assemblies 4 and 6 of the tent frame 2 relative to the truck 50. As was previously disclosed when referring to FIG. 2, belts 36 and 38 extend laterally along the front and back panels 12 and 14 of tent 1 through respective channels 32 and 34 thereof. Opposite ends of the belts 36 and 38 extend outwardly from the channels 32 and 34 of panels 12 and 14 so as to be connected to respective buckles 40. As is best shown in FIGS. 4 and 8 of the drawings, a receptacle, such as a cup 70, is slidably attached to each end of each of the belts 36 and 38 between a buckle 40 and a channel 32 or 34.

More particularly, the cups 70 are manufactured from a strong, tear resistant material, such as that used to form the tent 1. Each cup 70 is affixed (e.g. sewn) at a lip thereof to a loop 72. Each loop 72 has a central opening for receiving a belt 36 or 38 therethrough. The loops 72 are of sufficient size to slide axially along the belts 36 and 38 so as to position the cups 70 affixed thereto at suitable locations for receiving respective ends of the pole assemblies 4 and 6 which form the tent frame 2.

That is, the positions of each cup 70 may be selectively adjusted to receive one end of a pole assembly 6 or 8 depending upon the size and location of the frame 2 used to support the tent 1. The foregoing is easily accomplished by simply sliding the loops 72 of cups 70 to the desired positions along the belts 36 and 38. Accordingly, and in the assembled tent configuration, each of the belts 36 and 38 supports a pair of cups 70 by means of respective loops 72, and each of the cups 70 supports one end of a pole assembly 4 or 6 so that the tent 1 may be suspended above the bed 54 of truck 50.

However, and as should now be apparent, no modifications or changes are required to truck 50 to support the tent 1 thereon. More particularly, the entire weight of the frame 2 and the tent 1 is supported by the laterally extending belts 36 and 38 and the cups 70 attached thereto which receive respective ends of the pole assemblies 4 and 6, such that the pole assemblies need not contact or be secured to the body of truck 50. Moreover, the cups 70 are not permanently affixed to the body of the truck, but are otherwise supported by and free to move relative to the bed 54 along the belts 36 and 38 that are removably secured to the undercarriage of the truck by way of hold-down straps 42 which run downwardly along the sides 55 and 56 of the truck 50.

In this regard, the tent 1 may be quickly and easily removed from the truck 50 by lifting pole assemblies 4 and 6 of tent frame 2 out of the cups 70 and detaching the clasps 44 of hold down straps 42 from the undercarriage of the truck 50. The tent 1 may then be separated from the truck 50 and, after the pole assemblies 4 and 6 have been withdrawn from the sleeves 20 and 22 in which they are received, the tent may be folded into a compact package to facilitate transport and storage. The bed 54 of the truck 50 is then immediately ready for other uses without requiring any changes corresponding to the removal of the tent 1 therefrom.

It will be apparent that while a preferred embodiment of the invention has been shown and described, various modifications and changes may be made without departing from the true spirit and scope of the invention. For example, although the pole assemblies 4 and 6 of the tent frame 2 have been shown and described as arcing diagonally over the bed 54 of truck 50 so as to cross one another, it is to be understood that the pole assemblies 4 and 6 may otherwise extend vertically upward relative to the bed 54. In this case, the lower-most end of each pole assembly 4 and 6 would be received in a cup receptacle 70 so that the tent may be suspended above the bed 54 in the manner described above.

Having thus set forth the preferred embodiment of the invention, what is claimed is:

1. The combination of a motor vehicle having a substantially flat bed and a tent to be suspended above the bed of the vehicle, said tent comprising:

front, back and side panels joined together to form a tent enclosure;

a tent frame including at least one pole projecting above the bed of the vehicle and communicating with said front, back and side panels to position said tent above said bed; and receptacle means interconnected with and movable along at least one of said front, back and side panels of said tent so that the position of said receptacle means is adjustable relative to the bed of said truck to enable said receptacle means to receive and support one end of said pole of said tent frame.

2. The tent recited in claim 1, wherein at least two of said front, back and side panels of said tent are oppositely aligned from one another, said at least one pole of said tent frame being bent to form an arc above the bed of the vehicle, said tent further comprising receptacle means interconnected with each of said two oppositely aligned front, back and side panels to receive and support respective ends of said pole.

3. The tent recited in claim 2, wherein said receptacle means includes at least two cups interconnected with respective ones of said two oppositely aligned panels from said front, back and side panels of said tent in which to receive and support the respective opposite ends of said pole.

4. The tent recited in claim 3, wherein each of the two oppositely aligned panels from said front, back and side panels of said tent to which said two cups are respectively interconnected has a belt extending therethrough, said cups attached to respective ones of said belts.

5. The tent recited in claim 4, wherein each of said cups has a loop thereon for receiving a respective belt therethrough, said cups being slidably attached to said belts by means of said loops.

6. The tent recited in claim 4, further comprising clasp means interconnected with each end of said belts by which to releasably attach said belts to the vehicle and thereby hold said tent against the vehicle.

7. The tent recited in claim 1, wherein said tent frame comprises a plurality of poles projecting above the bed of the vehicle and communicating with the front, back and side panels of said tent to position said tent above said bed, said receptacle means interconnected with a plurality of panels from said front, back and side panels to receive and support the first ends of respective ones of said plurality of poles.

8. The tent recited in claim 7, wherein said receptacle means includes a plurality of cups interconnected with respective ones of said plurality of panels from said front, back and side panels to receive and support the first ends of respective ones of said plurality of poles.

9. The tent recited in claim 8, wherein said plurality of cups are movable relative to the bed of the vehicle.

10. For attachment to the rear of a motor vehicle having a substantially flat bed, a tent to be suspended above the bed of the vehicle and comprising:

front and back panels and side panels located between said front and back panels and joined thereto to form a tent enclosure;

a tent frame including a plurality of poles to project above the bed of the vehicle and communicate with said front, back and side panels to position said tent above said bed;

a belt attached to each of said front and back panels; and receptacle means attached to and slidable along each of said belts so as to be moved relative to the truck bed in order to receive and support first ends of respective ones of said plurality of poles of said tent frame.

11. The tent recited in claim 10, wherein said receptacle means includes a cup attached to and slidable along each of said belts in which to receive the first end of a respective one of said poles from said tent frame.

12. The tent recited in claim 11, wherein each cup has a loop for receiving one of said belts therethrough, said cup being attached to said belt by means of said loop so as to be slidable therealong relative to the bed of the truck.

13. The tent recited in claim 10, further comprising clasp means interconnected with each end of said belts by which to releasably attach said belts to the vehicle and thereby hold said tent against the vehicle.

14. The tent recited in claim 10, further comprising a plurality of cross strips extending between the front and back panels of said tent and said side panels therebetween.

15. The tent recited in claim 14, wherein first ends of said cross strips are affixed to said front and back panels, the second ends of said cross strips including means by which to detachably connect said cross strips to said side panels for pulling said front, back and side panels together.

16. For attachment to the rear of a motor vehicle having a substantially flat bed, a tent to be suspended above the bed of the vehicle and comprising:

a plurality of panels joined together to form a tent enclosure;

a tent frame including a plurality of poles to engage said panels and position said tent above the bed of the vehicle;

belt means attached to at least some of said plurality of panels in order to hold said tent above the bed of the motor vehicle;

means to detachably connect said belt means to the motor vehicle; and coupling means attached to and slidable along said belt means so as to be moved relative to the truck bed, said coupling means being coupled to and supporting first ends of respective ones of said plurality of poles of said tent frame.

17. The tent recited in claim 16, wherein said coupling means include loop means for receiving said belt means therethrough, said coupling means attached to and slidable along said belt means at said loop means.

18. The tent recited in claim 16, further comprising clasp means located at each end of said belt means by which to detachably connect said belt means to the motor vehicle.

19. The tent recited in claim 16, further comprising channel means extending along at least some of said plurality of panels which form said tent enclosure, said belt means being received through said channel means for attaching said belt means to said panels.

20. The tent recited in claim 16, wherein said coupling means are cups in which to receive and support said first ends of respective ones of said plurality of poles of said tent frame.

* * * * *